(12) United States Patent
Yazawa et al.

(10) Patent No.: US 8,085,500 B2
(45) Date of Patent: Dec. 27, 2011

(54) PERPENDICULAR MAGNETIC RECORDING HEAD WITH PARTIAL SIDE SHIELD LAYERS

(75) Inventors: Hisayuki Yazawa, Tokyo (JP); Takahiro Taoka, Tokyo (JP); Hiroshi Kameda, Tokyo (JP)

(73) Assignee: TDK Corporation, Tokyo (JP)

( * ) Notice: Subject to any disclaimer, the term of this patent is extended or adjusted under 35 U.S.C. 154(b) by 803 days.

(21) Appl. No.: 12/107,368

(22) Filed: Apr. 22, 2008

(65) Prior Publication Data

US 2008/0266723 A1    Oct. 30, 2008

(30) Foreign Application Priority Data

Apr. 25, 2007   (JP) ................. 2007-115679

(51) Int. Cl.
*G11B 5/127* (2006.01)
(52) U.S. Cl. ............................. 360/125.09
(58) Field of Classification Search .............. None
See application file for complete search history.

(56) References Cited

U.S. PATENT DOCUMENTS

| | | | |
|---|---|---|---|
| 7,295,401 B2 * | 11/2007 | Jayasekara et al. | 360/125.08 |
| 7,322,095 B2 | 1/2008 | Guan et al. | |
| 7,639,454 B2 * | 12/2009 | Lim et al. | 360/125.3 |
| 2005/0057852 A1 | 3/2005 | Yazawa et al. | |
| 2005/0141137 A1 | 6/2005 | Okada et al. | |
| 2007/0159719 A1 * | 7/2007 | Yamakawa et al. | 360/126 |
| 2007/0268626 A1 * | 11/2007 | Taguchi et al. | 360/126 |
| 2008/0297945 A1 * | 12/2008 | Han et al. | 360/125.3 |
| 2009/0168240 A1 * | 7/2009 | Hsiao et al. | 360/125.02 |

FOREIGN PATENT DOCUMENTS

| | | |
|---|---|---|
| JP | A-2005-92929 | 4/2005 |
| JP | A-2005-174449 | 6/2005 |
| JP | A-2005-190518 | 7/2005 |
| JP | A-2005-310363 | 11/2005 |

* cited by examiner

*Primary Examiner* — David D Davis
(74) *Attorney, Agent, or Firm* — Oliff & Berridge, PLC

(57) ABSTRACT

In a perpendicular magnetic recording head in which a magnetic pole part of a main magnetic pole layer exposed at a medium-opposing surface exhibits a trapezoidal form narrower on the leading edge side than on the trailing edge side, a pair of partial side shield layers made of a soft magnetic material are provided on both sides in the track width direction of the magnetic pole part of the main magnetic pole layer such as to be located more on the leading edge side of the magnetic pole part.

4 Claims, 14 Drawing Sheets

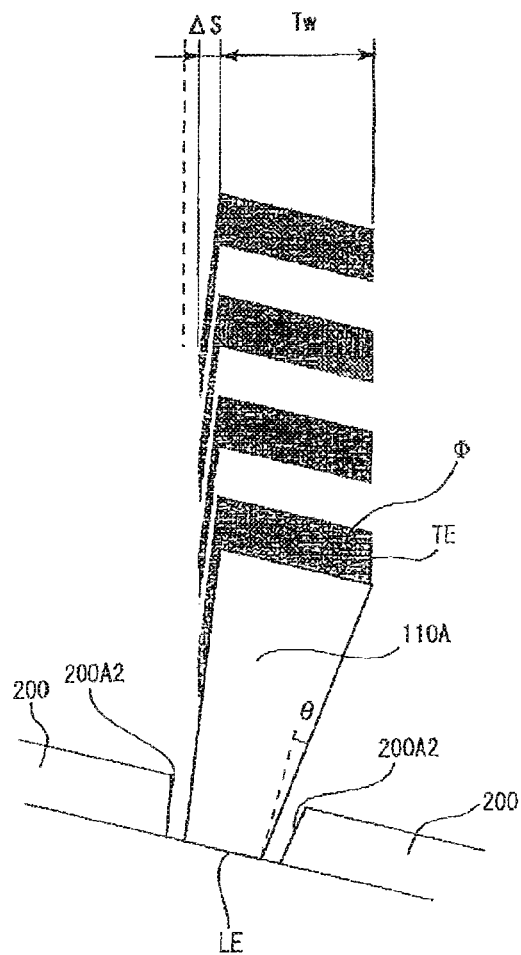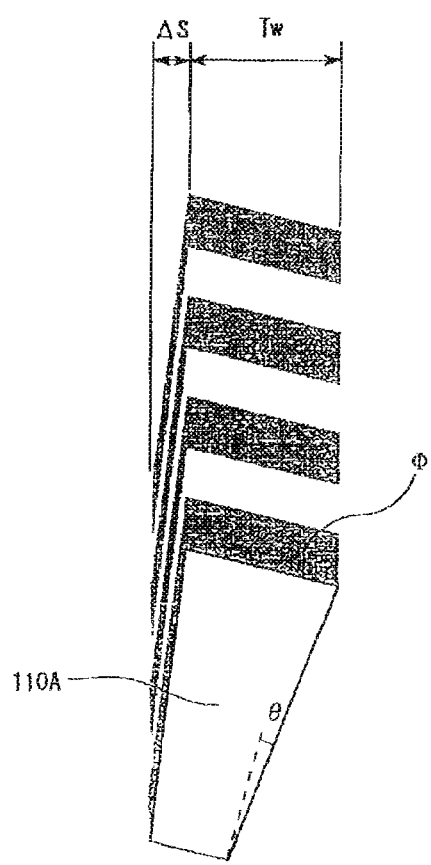

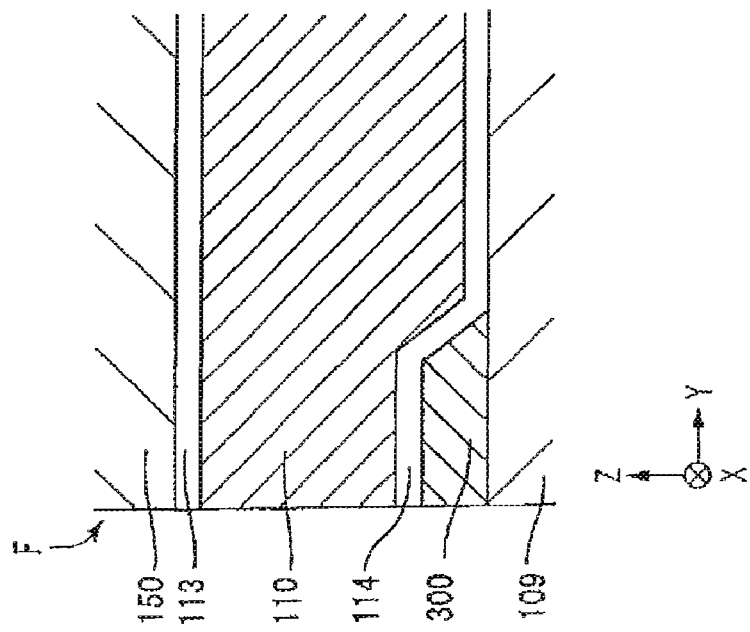
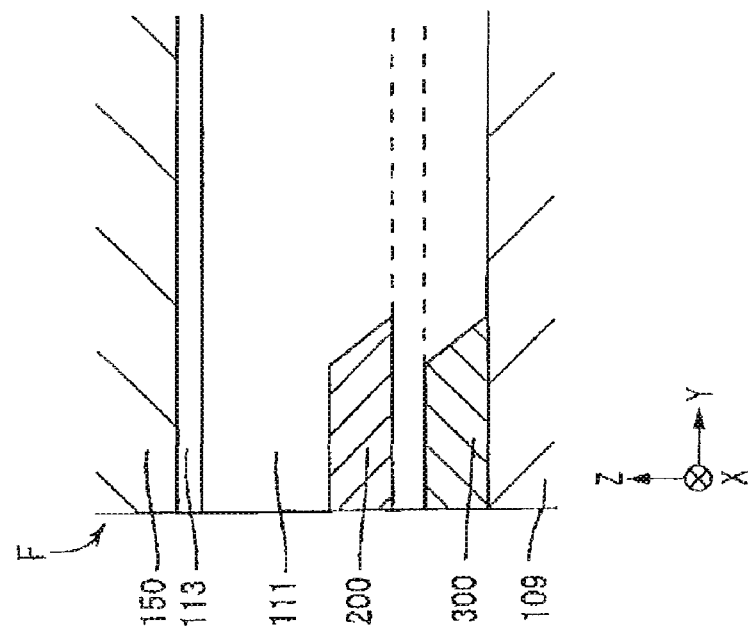

PERPENDICULAR MAGNETIC RECORDING HEAD WITH PARTIAL SIDE SHIELD LAYERS

BACKGROUND OF THE INVENTION

1. Field of the Invention

The present invention relates to a perpendicular magnetic recording head which is driven with a skew angle and performs a recording action by applying a recording magnetic field perpendicularly to a recording medium plane.

2. Related Background Art

As is well-known, a perpendicular magnetic recording head includes a main magnetic pole layer and a return yoke layer which have front end faces exposed at a surface opposing a recording medium (medium-opposing surface) and are magnetically coupled to each other on the deeper side of the medium-opposing surface in the height direction, a magnetic gap layer interposed between the main magnetic pole layer and return yoke layer on the medium-opposing surface, and a coil layer inducing a recording magnetic field between the main magnetic pole layer and return yoke layer upon energization. The recording magnetic field induced between the main magnetic pole layer and return yoke layer perpendicularly enters a hard magnetic film of the recording medium from the front end face of the main magnetic pole layer and returns to the front end face of the main magnetic pole layer through a soft magnetic film of the recording medium. This performs magnetic recording at a part opposing the front end face of the main magnetic pole layer. The size in the track width direction of the front end face of the main magnetic pole layer, i.e., recording track width size, has been becoming narrower as hard disk drives have been attaining higher recording densities.

In a perpendicular magnetic recording head having a narrowed track, how to suppress side fringing at the time of skewing where the head is driven in a state tilted with respect to a recording medium has become a problem.

As a method of suppressing side fringing at the time of skewing, it has conventionally been known to make a magnetic pole part of the main magnetic pole layer (the front end face exposed at the medium-opposing surface) attain a trapezoidal (bevel) form which is narrower on the leading edge side than on the trailing edge side when seen from the medium-opposing surface side. When the magnetic pole part of the main magnetic pole layer is narrower on the leading edge side than on the trailing edge side, magnetic fields leaking from side faces in the track width direction of the main magnetic pole layer at the time of skewing do not reach adjacent tracks on the recording medium whereby recording actions with less bleeding can be realized. The effect of suppressing side fringing becomes stronger as the bevel angle of the main magnetic pole layer is greater. However, the main magnetic pole layer with a narrowed track has a very small size in the track width direction. Therefore, when the bevel angle becomes greater, the main magnetic pole layer is shaved on the leading edge side, so as to exhibit an inverted triangular form, thereby failing to keep the size in the thickness direction. Since the main magnetic pole layer is formed by CMP (Chemical Mechanical Polishing) up to a position yielding a desirable thickness size after attaining a bevel form, fluctuations in the track width size due to CMP errors increases when the bevel angle becomes greater. Hence, it has not been possible for the main magnetic pole layer to attain a predetermined bevel angle or greater and fully suppress the side fringing.

Therefore, it has recently been proposed to provide the main magnetic pole layer with a magnetic shield layer as described in Patent Document 1 (Japanese Patent Application Laid-Open No. 20055-92929), Patent document 2 (Japanese Patent Application Laid-Open No. 2005-190518) and Patent Document 3 (Japanese Patent Application Laid-Open No. 2005-310363).

Patent Document 4 (Japanese Patent Application Laid-Open No. 2005-174449) discloses a structure in which a magnetic bias film is formed on both sides in the track width direction of a soft magnetic film which is a part of a recording magnetic pole film.

SUMMARY OF THE INVENTION

When the shield layer is provided like a flat film surrounding the main magnetic pole layer as in Patent Documents 1 to 3, however, not only leakage magnetic fluxes from sides of the main magnetic pole layer but also recording magnetic fluxes applied from the main magnetic pole layer to the recording medium are absorbed by the shield layer, whereby the recording magnetic field becomes extremely small. When the recording magnetic field intensity becomes extremely small as such, recording actions cannot be performed for recording media having a high coercivity, whereby the total recording performance will deteriorate even if the recording magnetic field gradient improves.

According to Patent Document 4, the magnetic bias film is a film for applying a magnetic bias in the direction of axis of easy magnetization to the soft magnetic film and in contact with the soft magnetic film, and thus does not have a shield function for absorbing leakage magnetic fields of the soft magnetic film.

It is an object of the present invention to provide a perpendicular magnetic recording head which can suppress side flinging at the time of skewing and favorably keep both of the recording magnetic field intensity and recording magnetic field gradient.

The present invention is achieved by focusing attention on the fact that, when a shield layer is not provided on the trailing edge side of the main magnetic pole layer but partly on the leading edge side thereof, leakage magnetic fluxes occurring on the leading edge side are absorbed by the shield layer, so that side fringing at the time of skewing can be suppressed wile magnetic fluxes transmitted to the trailing edge side are not absorbed, whereby the recording magnetic field intensity applied to the recording medium can be restrained from decreasing.

Namely, the present invention is a perpendicular magnetic recording head comprising a main magnetic pole layer and a return yoke layer which are laminated with a predetermined distance therebetween on a surface opposing a recording medium and magnetically coupled to each other on the deeper side of the medium-opposing surface in a height direction, a magnetic pole part of the main magnetic pole layer exposed at the medium-opposing surface exhibiting a trapezoidal form narrower on a leading edge side than on a trailing edge side when seen from the medium-opposing surface; wherein a pair of partial side shield layers made of a soft magnetic material are provided on both sides in a track width direction of the magnetic pole part of the main magnetic pole layer so as to be located more on the leading edge side of the magnetic pole part.

Specifically, it will be preferred if the pair of partial side shield layers are provided such that, at least on the side of an end face opposing the magnetic pole part of the main magnetic pole layer, a center line in the thickness direction of the partial side shield layers is positioned on the leading edge side of a center line in the thickness direction of the magnetic pole part.

Preferably, in the pair of partial side shield layers, an end face opposing the magnetic pole part of the main magnetic pole layer forms a taper surface corresponding to the trapezoidal form of the magnetic pole part. This mode can easily locate the end face opposing the magnetic pole part of the main magnetic pole layer closer to the magnetic pole part of the main magnetic pole layer.

Preferably, in the pair of partial side shield layers, the end face opposing the magnetic pole part of the main magnetic pole layer is positioned between a side face position in the track width direction on the trailing edge surface of the magnetic pole part and a side face position in the track width direction on the leading edge surface of the magnetic pole part. This mode increases the amount of magnetic fluxes absorbed by the pair of partial side shield layers, whereby leakage magnetic fluxes causing side fringing can be reduced.

A bottom shield layer made of a soft magnetic material magnetically separated from the pair of partial side shield layers can be provided below the leading edge of the magnetic pole part of the main magnetic pole layer. The bottom shield layer absorbs leakage magnetic fluxes from the leading edge of the magnetic pole part, whereby the effect of suppressing side ringing can be made stronger.

The present invention provides a perpendicular magnetic recording head in which a pair of partial side shield layers and a bottom shield layer absorb leakage magnetic fluxes on the leading edge side of the main magnetic pole layer without absorbing recording magnetic fluxes directed from the trailing edge side to the recording medium, so as to suppress side fringing at the time of skewing, thereby improving the recording magnetic field gradient and being able to favorably keep the improved recording magnetic field gradient.

BRIEF DESCRIPTION OF THE DRAWINGS

FIG. 6A is a schematic view for explaining recording magnetic field patterns at the time of skewing, representing a case where a pair of partial side shield layers are provided;

FIG. 6B is a schematic view for explaining recording magnetic field patterns at the time of skewing, representing a case where the pair of partial side shield layers are not provided;

FIG. 11A is a sectional view taken along the line XIa-XIa of FIG. 10;

FIG. 11B is a sectional view taken along the line XIb-XIb of FIG. 10;

DESCRIPTION OF THE PREFERRED EMBODIMENT

In the following, the present invention will be explained with reference to the drawings. In each drawing, X, Y, and Z directions are defined by the track width direction, the height direction, and the laminating direction (thickness direction) of layers constituting a perpendicular magnetic recording head, respectively.

FIGS. 1 to 5 show the perpendicular magnetic recording head H1 in accordance with a first embodiment of the present invention.

Figure 1:
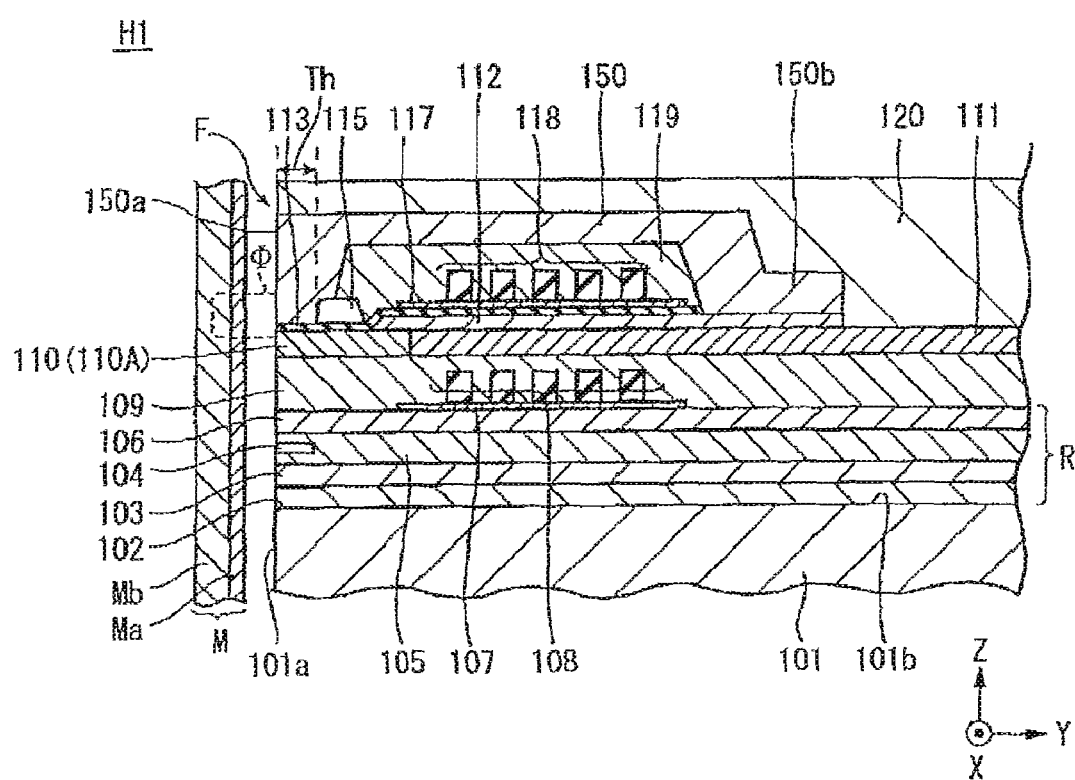
FIG. 1 is a sectional view showing the overall structure of the perpendicular magnetic recording head in accordance with the first embodiment.

FIG. 1 is a vertical sectional view showing the overall structure of the perpendicular magnetic recording head H1. The perpendicular magnetic recording head H1 provides a recording medium M with a recording magnetic flux Φ perpendicular thereto, thereby perpendicularly magnetizing a hard magnetic film Ma of the recording medium M. The recording medium M has the hard magnetic film Ma with a higher remnant magnetization on the medium surface side and a soft magnetic film Mb with a higher magnetic permeability on the inner side of the hard magnetic film Ma. The recording medium M is shaped like a disk, for example, and is rotated about the center of the disk as a rotary axis. A slider 101 is formed by a nonmagnetic material such as $Al_2O_3$.TiC. The slider 101 has a medium-opposing surface 101a opposing the recording medium M. As the recording medium M rotates, a surface airflow levitates the slider 101 from the surface of the recording medium M.

The trailing-side end face 101b of the slider 101 is formed with a nonmagnetic insulating layer 102 made of an inorganic material such as $Al_2O_3$ or $SiO_2$, while a reproducing part R is formed on the nonmagnetic insulating layer 102. The reproducing part R has a lower shield layer 103, an upper shield layer 106, an inorganic insulating layer (gap insulating layer) 105 filling the gap between the lower and upper shield layers 103, 106, and a reproducing device 104 positioned within the inorganic insulating layer 105. The reproducing device 104 is a magnetoresistive device such as AMR, GMR, or TMR.

By way of a coil insulating foundation layer 107, a first coil layer 108 constituted by a plurality of lines made of a conductive material is formed on the upper shield layer 106. The first coil layer 108 is made of at least one nonmagnetic metal material selected from Au, Ag, Pt, Cu, Cr, Al, Ti, NiP, Mo, Pd, and Rh, for example. It may have a multilayer structure in which such nonmagnetic metal materials are laminated. A coil insulating layer 109 made of $Al_2O_3$, $SiO_2$, or the like is formed about the first coil layer 108.

The upper face of the coil insulating layer 109 is made flat. An undepicted plating foundation layer is formed on the flat surface, while a main magnetic pole layer 110 made of a ferromagnetic material having a high saturated magnetic flux density such as Ni—Fe, Co—Fe, or Ni—Fe—Co is formed on the plating foundation layer.

Figure 2:
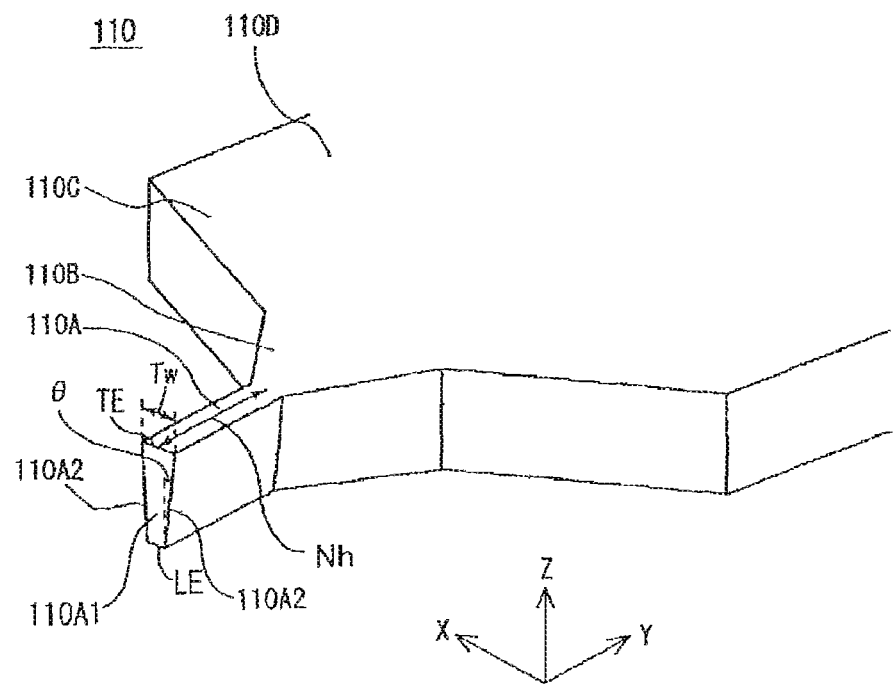
FIG. 2 is a perspective view for explaining the main magnetic pole form.

As shown in FIG. 2, the main magnetic pole layer 110 has a magnetic pole part (pole straight part) 110A, a $1^{st}$ flare part 110B, a $2^{nd}$ flare part 110C, and a base part 110D successively from the medium-opposing surface F side. The magnetic pole part 110A has a front end face 110A1 exposed at the medium-opposing surface F. Its size in the track width direction at the trailing edge TE is defined by a recording track width Tw, while its size in the height direction is defined by a predetermined neck height Nh. The magnetic pole part 110A uniformly yields a trapezoidal (bevel) form which is narrower on the leading edge side LE than on the trailing edge side TE throughout its length when seen from the medium-opposing surface F. Beveling the magnetic pole part 110A can reduce leakage magnetic fields reaching from the leading edge LE side to adjacent tracks on the recording medium M, thereby yielding the side fringing suppressing effect. At present the recording track width Tw is about 100 to 150 nm, the neck height Nh is about 100 to 150 nm, the thickness is about 200 to 300 nm, and the bevel angle $\theta$ is about 7 to 9°. The $1^{st}$ flare part 110B is an area for narrowing the recording magnetic field from the base part 110D to the magnetic pole part 110A and expands the size in the track width direction from the magnetic pole part 110A to the deeper side in the height direction. The $2^{nd}$ flare part 110C is an area for adjusting a domain structure generated in the base part 110D after excitation such that it is oriented in the track width direction, and joins the $1^{st}$ flare part 110B and the base part 110D to each other. The main magnetic pole layer 110 of this embodiment is not formed on the whole coil insulating layer 109 but locally on only the medium-opposing surface F side thereof, and is magnetically connected to an auxiliary yoke layer 112 at the base part 110D. The auxiliary yoke layer 112 is made of a magnetic material having a saturated magnetic flux density lower than that of the main magnetic pole layer 110 and transmits magnetic fluxes of the recording magnetic field induced by the recording coil (first and second coil layers 108, 118) to the main magnetic pole layer 110. A nonmagnetic material layer 111 is formed about the main magnetic pole layer 110, and is made flat such that the upper face of the main magnetic pole layer 110 is flush with the upper face of the nonmagnetic material layer 111.

A magnetic gap layer 113 made of an inorganic nonmagnetic insulating material such as $Al_2O_3$ or $SiO_2$, for example, is formed by a thickness corresponding to a predetermined gap distance on the main magnetic pole layer 110 and auxiliary yoke layer 112. The thickness of the magnetic gap layer 113 is about 50 nm at present. On the magnetic gap layer 113, a height determining layer 115 is formed at a position retracted from the medium-opposing surface F by a predetermined throat height Th to the deeper side in the height direction, while the second coil layer 118 is formed on the deeper side of the height determining layer 115 in the height direction by way of a coil insulating foundation layer 117.

As with the first coil layer 108, the second coil layer 118 is formed by a plurality of lines made of a conductive material. For example, the second coil layer 118 is made of at least one nonmagnetic metal material selected from Au, Ag, Pt, Cu, Cr, Al, Ti, NiP, Mo, Pd, and Rh. It may have a multilayer structure in which such nonmagnetic metal materials are laminated.

The first and second coil layers 108, 118 are electrically connected to each other at their end parts in the track width direction (depicted X direction) so as to form a solenoid. The form of coil layers (magnetic field generating means) is not limited to the solenoid form, though. A coil insulating layer 119 is formed about the second coil layer 118.

A return yoke layer 150 made of a ferromagnetic material having a high saturated magnetic flux density such as Ni—Fe, Co—Fe, or Ni—Fe—Co is formed such as to extend over the coil insulating layer 119, height determining layer 115, and magnetic gap layer 113. The return yoke layer 150 has a front end face 150a, which is exposed at the medium-opposing surface F and opposes the magnetic pole part 110A of the main magnetic pole layer 110 while interposing the magnetic gap layer 113 therebetween, and a connecting part 150b magnetically connecting with the base part 110D of the main magnetic pole layer 110 through the auxiliary yoke layer 112 on the deeper side in the height direction. The throat height Th of the return yoke layer 150 is determined by the height determining layer 115. The return yoke layer 150 is covered with a protecting layer 120 made of an inorganic nonmagnetic insulating material.

Figure 3:
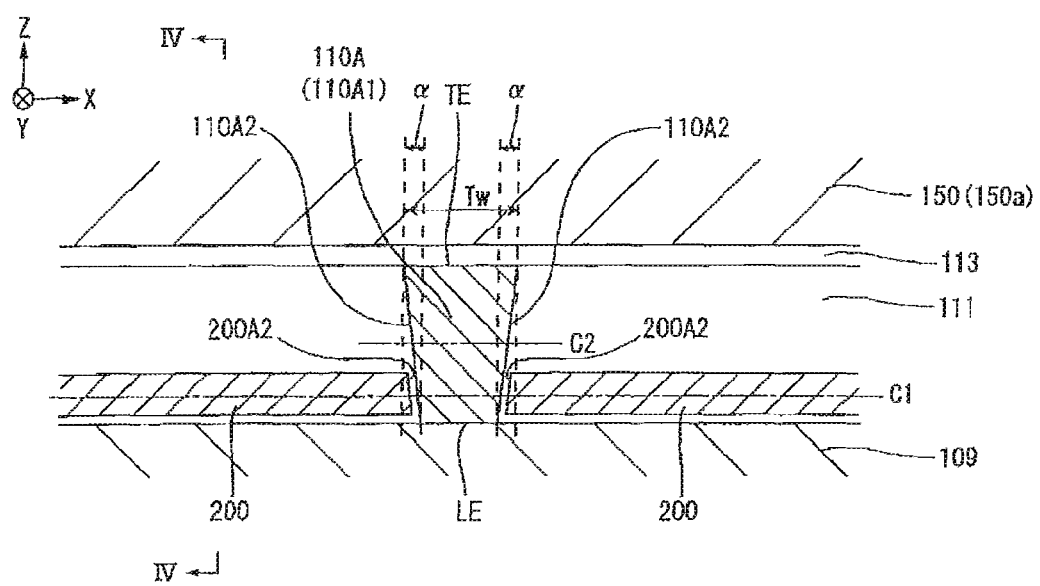
FIG. 3 is a sectional view showing the structure of the main magnetic pole layer and its surroundings including a pair of partial side shield layers as seen from the medium-opposing surface side.
Figure 4:
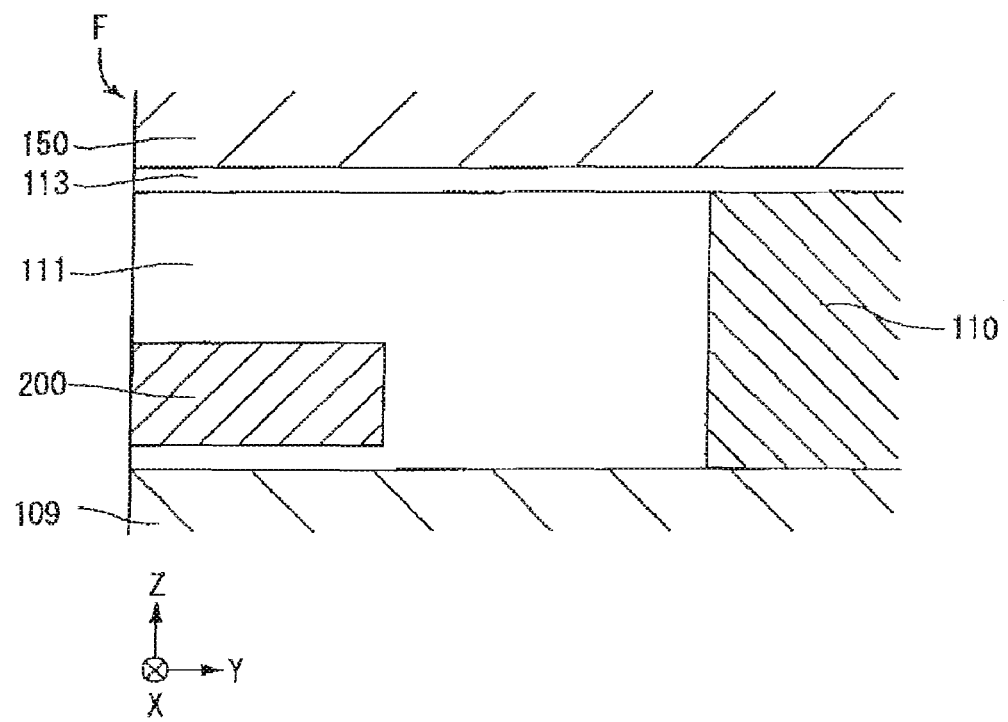
FIG. 4 is a sectional view taken along the line IV-IV of FIG. 3.
Figure 5:
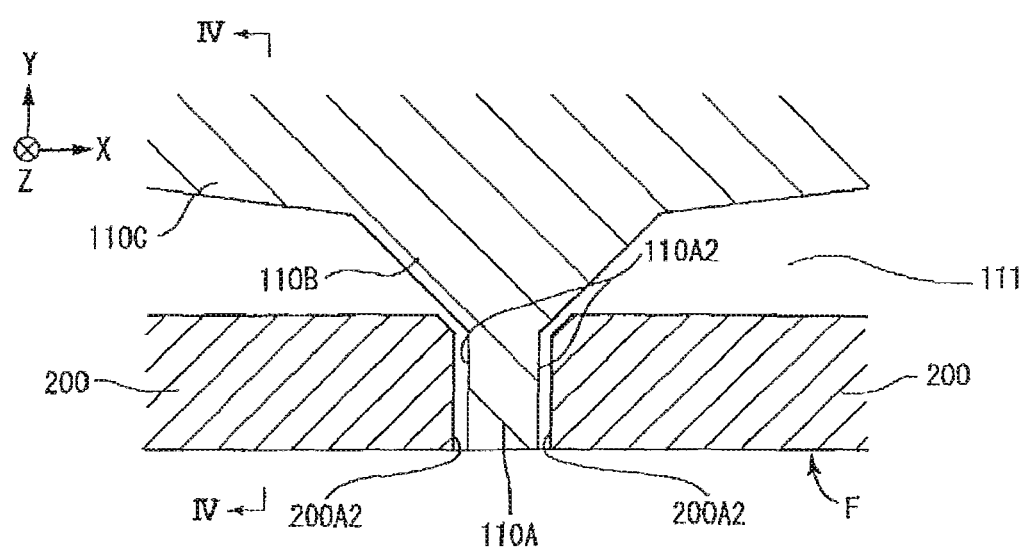
FIG. 5 is a plan view showing a pair of partial side shield layers.

As shown in FIGS. 3 to 5, the perpendicular magnetic recording head H1 having the foregoing overall structure includes a pair of partial side shield layers 200 provided on both sides in the track width direction of the magnetic pole part 110A of the main magnetic pole layer 110 and located more on the leading edge LE side. FIG. 3 is a vertical sectional view showing a structure of the main magnetic pole and thereabout including the pair of partial side shield layers 200 under magnification. FIG. 4 is a transverse sectional view taken along the line IV-IV of FIGS. 3 and 5. FIG. 5 is a plan view showing the pair of partial side shield layers 200.

The pair of partial side shield layers 200 are formed by a soft magnetic material such as NiFe or NiFeCo, for example, on the coil insulating layer 109 by way of the nonmagnetic material layer 111, and has a magnetic shield function for absorbing side magnetic fluxes leaking from both side faces 110A2 in the track width direction of the magnetic pole 110A of the main magnetic pole layer 110. Here the thickness of the pair of partial side shield layers 200 is controlled such that when a virtual line indicating middle positions (positions at the ½ of the total thickness) in the thickness direction of the pair of partial side shield layers 200 and a virtual line indicating those of the magnetic pole part 110A in the main magnetic pole layer 110 are referred to as center lines C1, C2, respectively, the center line C1 is positioned on the leading edge LE side of the center line C2 in the thickness direction of the magnetic pole part 110A of the main magnetic pole layer 110. Namely, the pair of partial side shield layers 200 do not exist on the trailing edge TE side of the magnetic pole part 110A but only on the leading edge LE side thereof.

The pair of partial side shield layers 200 have end faces 200A2 opposing both side faces 110A2 in the track width direction of the magnetic pole part 110A of the main magnetic pole layer 110. The end faces 200A2 form taper surfaces corresponding to the trapezoidal form of the magnetic pole part 110A and increasing the thickness as they are distanced farther in the track width direction from their corresponding side faces 110A2 of the magnetic pole part 110A, so as to be parallel to the side faces 110A2. The end faces 200A2 are positioned in overlap areas $\alpha$ (FIG. 3) with the magnetic pole part 110A so as to be able to absorb more of side magnetic fluxes leaking from the side faces 110A2 of the magnetic pole part 110A. Each overlap area $\alpha$ is an area from a side face position in the track width direction at the trailing edge TE of the magnetic pole part 110A to a side face position in the track width direction at the leading edge LE of the magnetic pole part 110A. The gap from the end faces 200A2 of the pair of partial side shield layers 200 to their corresponding side faces 110A2 of the magnetic pole part 110A can be set appropriately in response to the bevel angle θ of the magnetic pole part 110A. Specifically, it will be practical if the gap is about 20 nm when the bevel angle θ of the magnetic pole part 110A is about 7°. The pair of partial side shield layers 200 have a uniform thickness except for the end faces 200A2.

The pair of partial side shield layers 200 are elongated in the track width direction, while being formed such as to extend from the magnetic pole part 110A of the main magnetic pole layer 110 to a part of the $1^{st}$ flare part 110B in the height direction, thus yielding a substantially oblong two-dimensional form as shown in FIG. 5. The nonmagnetic material layer 111 is formed about the pair of partial side shield layers 200, whereby the pair of partial side shield layers 200 are magnetically separated from each other (have no magnetic connections to other magnetic material layers).

By an undepicted driving means, the perpendicular magnetic recording head H1 is driven with a skew angle in a radial direction of the recording medium M (from its inner peripheral side to outer peripheral side or vice versa), so as to levitate in a state where the slider 101 is tilted with respect to the recording medium M (recording medium plane). The magnetic flux generated upon energization of the recording coil (first and second coil layers 108, 118) is transmitted from the auxiliary yoke layer 112 to the base part 110D of the main magnetic pole layer 110, narrowed tough the $2^{nd}$ flare part 110C and $1^{st}$ flare part 110B from the base part 110D, and then perpendicularly applied as the recording magnetic field Φ from the front end face 110A1 of the magnetic pole part 110A to the recording medium M. This records magnetic information onto the recording medium M. At the time of this recording action, the pair of partial side shield layers 200 absorb only side magnetic fluxes (leakage magnetic fields) spreading from both side faces 110A2 of the magnetic pole part 110A on the leading edge LE side and are not involved with the recording magnetic field Φ directed from the magnetic pole part 110A to the recording medium M. At the time of skewing, the slider 101 is tilted as mentioned above, whereby the side fringing can be suppressed by reducing the side magnetic fluxes occurring from the leading edge LE side of both side faces 110A2 of the magnetic pole part 110A even when the side magnetic fluxes occurring from both side faces 110A2 are not completely eliminated. As shown in FIG. 6A, providing the pair of partial side shield layers 200 can make the side fringe width ΔS smaller than that in the case without the pair of partial side shield layers 200, thereby preventing problems such as recording fringing onto the recording medium M and erasing of recording information in adjacent recording tracks from occurring. At the time of no skewing (with a skew angle of 0°), the side magnetic fluxes from both side faces 110A2 are reduced by the bevel form of the magnetic pole part 110A itself, whereby side fringing can be suppressed. FIGS. 6A and 6B show the recording track width Tw and side fringe width ΔS in the case where the skew angle is 14° while the bevel angle θ of the magnetic pole part 110A is 7°. The broken line in FIG. 6A indicates the side fringe width ΔS in the case shown in FIG. 6B where the pair of partial side shield layers 200 are not provided.

Figure 7A:
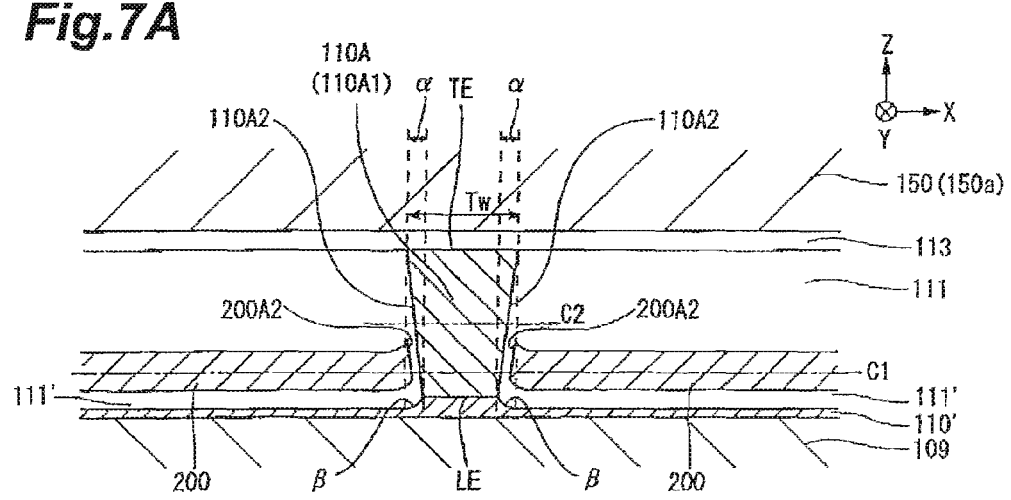
FIG. 7A is sectional views showing modified examples of the pair of partial side shield layers.
Figure 7B:
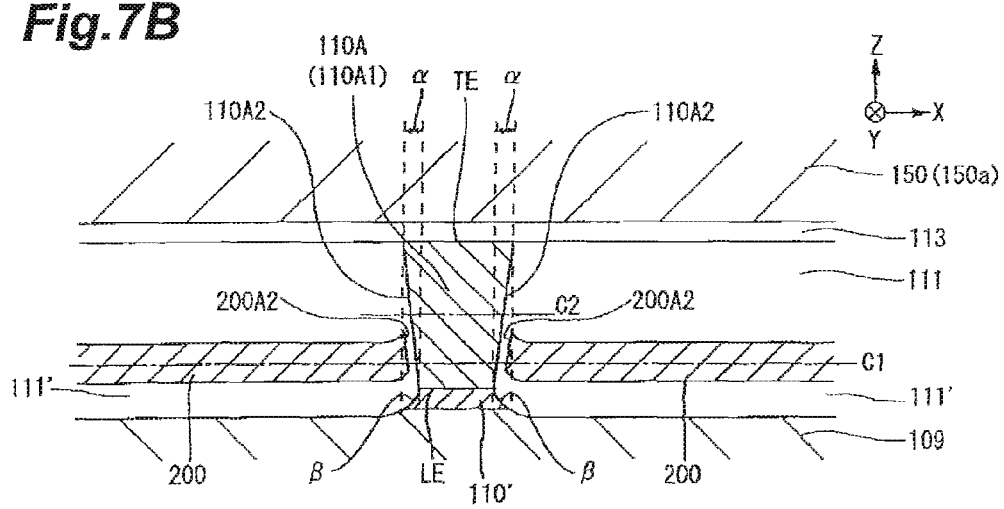
FIG. 7B is sectional views showing modified examples of the pair of partial side shield layers.

When seen microscopically, the pair of partial side shield layers 200 may be formed such as to tilt on the sides of the end faces 200A2 opposing the magnetic pole part 110A of the main magnetic pole layer 110 as shown in FIG. 7A depending on their method of manufacture. When forming the main magnetic pole layer 110 by plating, for example, a plating foundation layer 110' is formed on the coil insulating layer 109, a resist frame defining the two-dimensional form of the main magnetic pole layer and the bevel form of the magnetic pole part is formed on the plating foundation layer 110', and the main magnetic pole layer 110 is formed by plating within the resist frame. Subsequently both side faces 110A2 of the magnetic pole part 110A of the main magnetic pole layer 110 are thinned by dry etching, so as to finely adjust the recording track width Tw. Here, the part of the plating foundation layer 110' located in the vicinity of both side faces 110A2 of the magnetic pole part 110A is also thinned, whereby tilted surfaces β are formed by the plating foundation layer 110' on the leading edge LE side of both side faces 110A2 of the magnetic pole part 110A. The pair of partial side shield layers 200 are formed on the plating foundation layer 110' by way of the nonmagnetic material layer 111', and thus are tilted in conformity to the tilted surfaces β of the plating foundation layer 110' on the end face 200A2 sides opposing both side faces 110A2 of the magnetic pole part 110A. Though the main magnetic pole layer 110 is formed by plating in the first embodiment, it may be formed by sputtering as well. Even in the case where the main magnetic pole layer 110 is formed by sputtering, the pair of partial side shield layers 200 yield a form similar to that shown in FIG. 7A when seen microscopically. Even when the plating foundation layer 110' is totally removed by dry etching as shown in FIG. 7B, the tilted surfaces β are transferred onto the coil insulating layer 109, whereby the pair of partial side shield layers 200 yield a form similar to that show in FIG. 7A. The plating foundation layer 110' is omitted in FIG. 3.

Figure 8A:
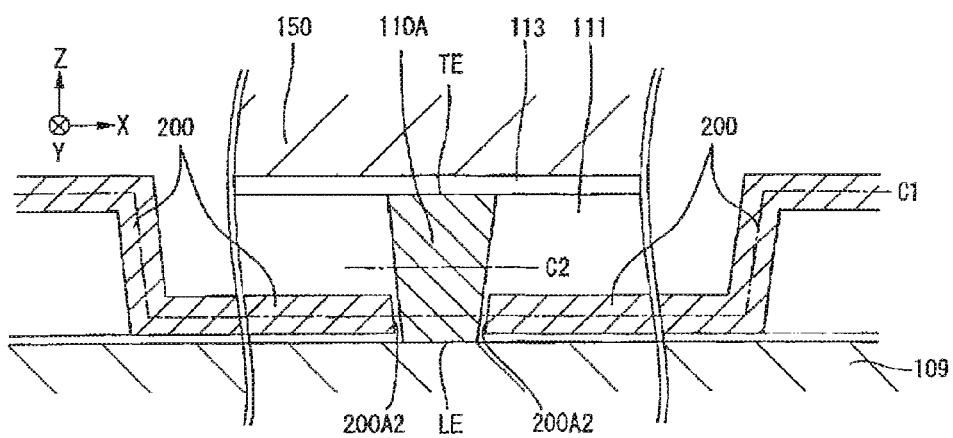
FIG. 8A is sectional views showing modified examples of the pair of partial side shield layers.
Figure 8B:
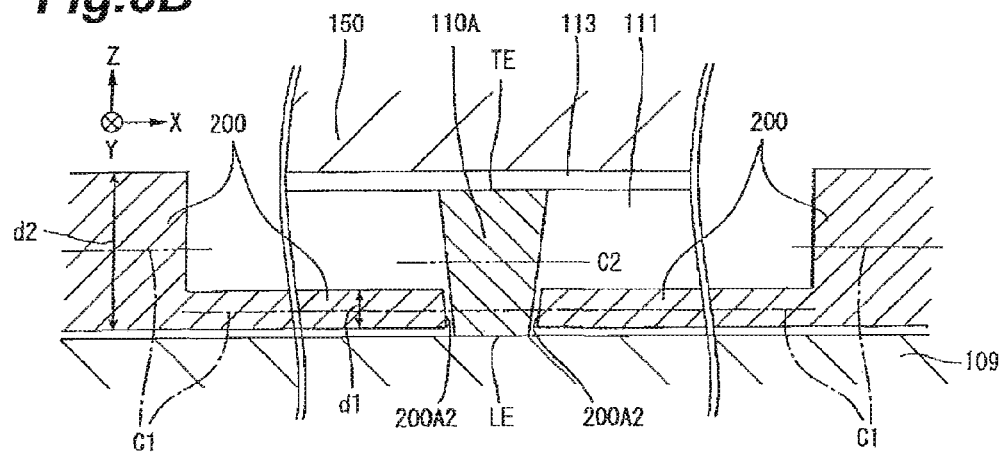
FIG. 8B is sectional views showing modified examples of the pair of partial side shield layers.

Though the pair of partial side shield layers 200 are formed such that their center line C1 in the thickness direction is positioned on the leading edge LE side of the center line C2 in the thickness direction of the magnetic pole part 110A of the main magnetic pole layer 110 throughout their length, it will be sufficient if the center line C1 in the thickness direction of the pair of partial side shield layers 200 is positioned on the leading edge LE side of the center line C2 in the thickness direction of the magnetic pole part 110A at least on the end face 200A2 sides opposing both side faces 110A2 of the magnetic pole part 110A. Namely, the pair of partial side shield layers 200 can be formed such that their center line C1 in the thickness direction is positioned on the trailing edge TE side of the center line C2 in the thickness direction of the magnetic pole part 110A as shown in FIGS. 8A and 8B at positions sufficiently separated from the magnetic pole part 110A in the track width or height direction. FIG. 8A shows a mode in which the pair of partial side shield layers 200 are formed with a uniform thickness except for the end faces 200A2 and raised to the same lamination height as that of the trailing edge TE of the magnetic pole part 110A by forming steps at positions sufficiently separated from the magnetic pole part 110A in the track width direction. FIG. 8B shows a mode in which the pair of partial side shield layers 200 are formed by a first thickness d1 on the end face 200A2 sides such that the center line C1 in the thickness direction is positioned on the leading edge LE side of the center line C2 in the thickness direction of the magnetic pole part 110A and by a second thickness d2 at positions sufficiently separated from the magnetic pole part 110A in the track width direction such that the center line C1 in the thickness direction is positioned on the trailing edge TE side of the center line C2 in the thickness direction of the magnetic pole part 110A.

Figure 9:
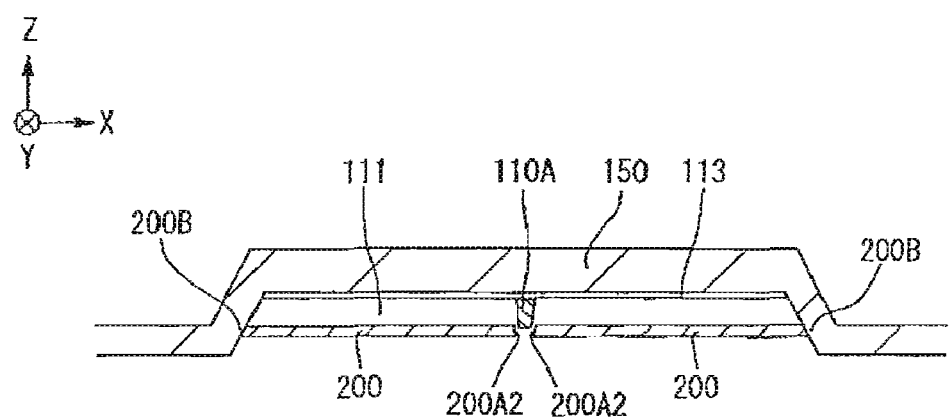
FIG. 9 is a sectional view showing a modified example of the pair of partial side shield layers in a mode different from those of FIGS. 7A, 7B, 8A and 8B.

Though the pair of partial side shield layers 200 are provided such as to be magnetically independent from each other in the first embodiment, the pair of partial side shield layers 200 may be connected to the return yoke layer 150 at end faces 200B extended in the track width direction as shown in FIG. 9, so as to be provided as a magnetic body magnetically integrated with the return yoke layer 150.

Figure 10:
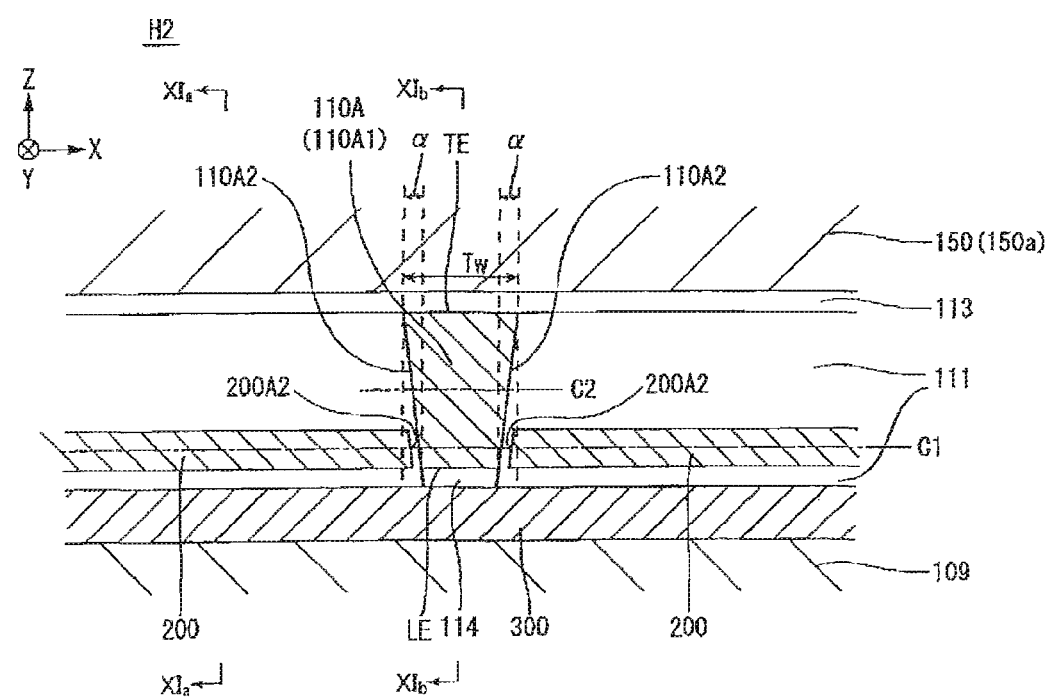
FIG. 10 is a sectional view showing the structure of the main magnetic pole layer and its surroundings including a bottom shield layer and a pair of partial side shield layers in the perpendicular magnetic recording head in accordance with the second embodiment.
Figure 12:
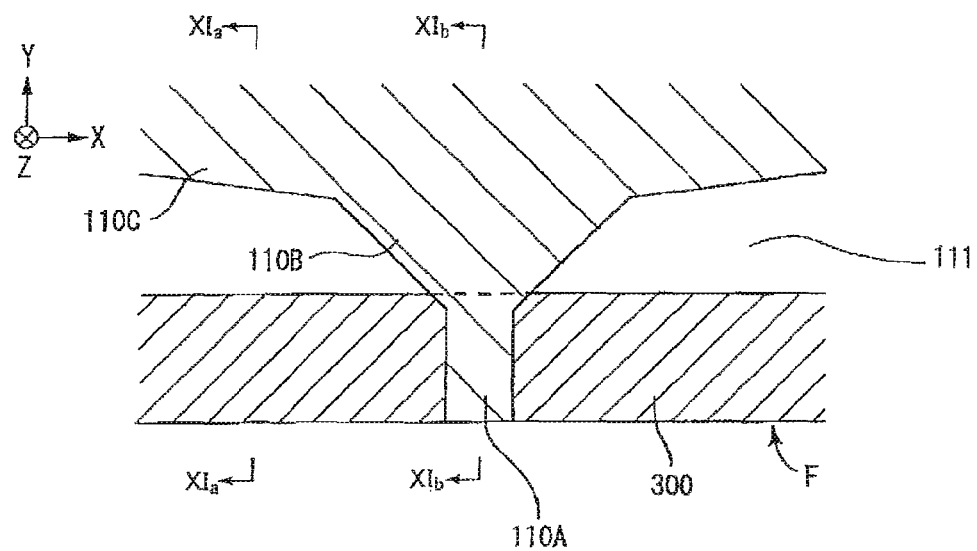
FIG. 12 is a plan view showing the bottom shield layer.

FIGS. 10 to 12 show the perpendicular magnetic recording head H2 in accordance with a second embodiment of the present invention. The perpendicular magnetic recording head H2 is one in which a bottom shield layer 300 made of a soft magnetic material such as NiFe or NiFeCo, for example, is provided below the leading edge LE of the magnetic pole part 110A of the main magnetic pole layer 110 in the perpendicular magnetic recording head H1 in accordance with the first embodiment FIG. 10 is a vertical sectional view showing a structure of the main magnetic pole and its surroundings including a pair of partial side shield layers 200 and the bottom shield layer 300 under magnification. FIG. 11A is a transverse sectional view taken along the line XIa-XIa of FIGS. 10 and 12. FIG. 11B is a transverse sectional view taken along the line XIb-XIb of FIGS. 10 and 12. FIG. 12 is a plan view showing the bottom shield layer 300.

The bottom shield layer 300 is a soft magnetic film with no macroscopic irregularities which is formed by a uniform thickness on the coil insulating layer 109 and has a magnetic shield function for absorbing magnetic fields leaking from the leading edge LE of the magnetic pole part 110A of the main magnetic pole layer 110. The bottom shield layer 300 is not only formed below the leading edge LE of the magnetic pole part 110A, but also elongated in the track width direction, and exists below the pair of partial side shield layers 200 as well. As with the pair of partial side shield layers 200, the bottom shield layer 300 is formed from the magnetic pole part 110A of the main magnetic photo layer 110 to a part of the $1^{st}$ flare part 110B in the height direction, so as to exhibit a substantially oblong two-dimensional form as shown in FIG. 12. It will be sufficient if the bottom shield layer 300 exists at least below the leading edge LE of the magnetic pole part 110A without being restricted to the positional relationship shown in FIG. 12.

The bottom shield layer 300 is placed in a magnetically isolated state (without any magnetic connection to other magnetic material layers) by the nonmagnetic material layers 111, 114 formed thereabout. The nonmagnetic material layer 111 is interposed between the bottom shield layer 300 and the pair of partial side shield layers 200. Though not depicted, the nonmagnetic material layer 111 is also interposed between the bottom shield layer 300 and the return yoke layer 150. The nonmagnetic material layer 114 is formed on the bottom shield layer 300. The main magnetic pole layer 110 is formed on the nonmagnetic material layer 114.

For absorbing more of magnetic fluxes leaking from the leading edge LIE of the magnetic pole part 110A of the main magnetic pole layer 110, it will be desirable for the bottom shield layer 300 to have a gap of about 10 to 50 nm with respect to the leading edge LE of the magnetic pole part 110A of the main magnetic pole layer 110 and a thickness of about 50 to 400 nm. In the bottom shield layer 300, the amount of absorption of magnetic fluxes increases as the gap with the leading edge LB of the magnetic pole part 110A becomes smaller. As the thickness of the bottom shield layer 300 increases, the amount of absorption of magnetic fluxes becomes greater, and magnetic saturation is harder to be caused by the magnetic fluxes absorbed from the leading edge LE of the magnetic pole part 110A. The gap between the bottom shield layer 300 and the leading edge LE of the magnetic pole part 110A can be defined by the thickness of the nonmagnetic material layer 114.

As in the foregoing, the second embodiment is equipped with not only the pair of partial side shield layers 200 but also the bottom shield layer 300 positioned below the leading edge LE of the magnetic pole part 110A, so that the bottom shield layer 300 can absorb the magnetic fluxes leaking from the leading edge LE of the magnetic pole part 110A, thereby suppressing side fringing more than in the first embodiment.

Figure 13A:
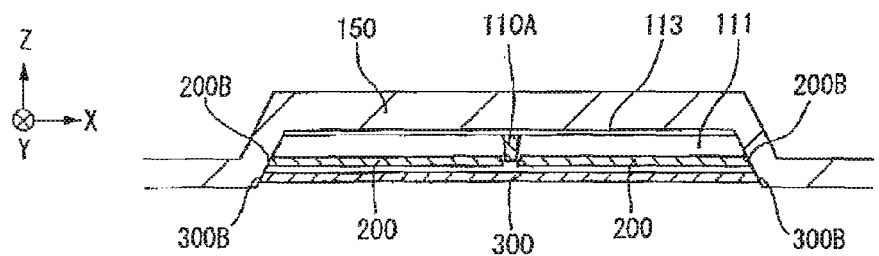
FIG. 13A, FIG. 13B and FIG. 13C are sectional views showing modified examples of the pair of side shield layers and bottom shield layer.
Figure 13B:
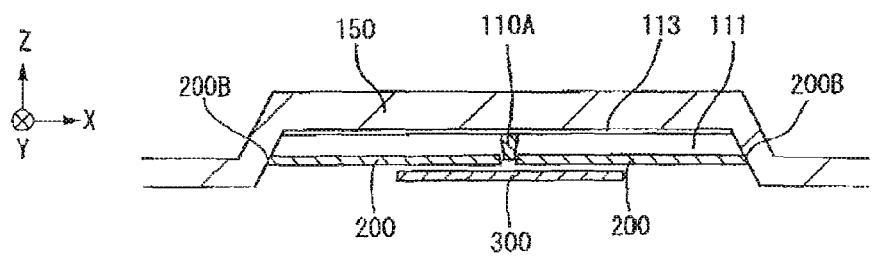
Figure 13C:
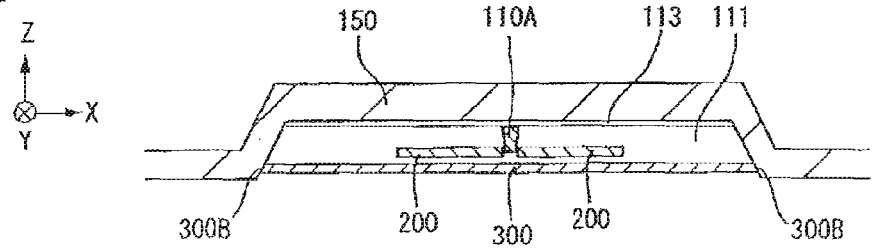

Though the pair of partial side shield layers 200 and bottom shield layer 300 are provided in a magnetically independent state (without any magnetic connection to other magnetic materials) in the second embodiment, they may be connected to the return yoke layer 150. FIG. 13A shows a mode in which the pair of partial side shield layers 200 and bottom shield layer 300 are connected to the return yoke layer 150 at end faces 200B, 300B extended in the track width direction, so as to be provided as a magnetic body magnetically integrated with the return yoke layer 150. FIG. 13B shows a mode in which the pair of partial side shield layers 200 are connected to the return yoke layer 150 at the end faces 200B extended in the track width direction, whereas FIG. 13C shows a mode in which the bottom shield layer 300 is connected to the return yoke layer 150 at the end faces 300B extended in the track width direction.

Effects of the present invention will now be explained with reference to FIG. 14 by comparing Examples 1 to 4 with Comparative Examples 5 to 8.

Examples 1 to 4 are perpendicular magnetic recording heads each equipped with a pair of partial side shield layers 200 on the leading edge LE side of the magnetic pole part 110A of the main magnetic pole layer 110, and correspond to the perpendicular magnetic recording head H1 in accordance with the above-mentioned first embodiment. The pair of partial side shield layers 200 are made of NiFe in Examples 1 and 2. The partial side shield layers 200 are provided in a magnetically independent state in Example 1, and connected to the return yoke layer 150 in Example 2. The pair of partial side shield layers 200 are made of NiFeCo in Examples 3 and 4. The partial side shield layers 200 are provided in a magnetically independent state in Example 3, and connected to the return yoke layer 150 in Example 4. Namely, Examples 1 and 3 differ from Examples 2 and 4 only in whether the pair of partial side shield layers 200 are connected to the return yoke layer 150 or not whereas Examples 1 and 2 differ from Examples 3 and 4 only in terms of the shield material forming the pair of partial side shield layers 200. Examples 1 to 4 have the same structure except for the pair of partial side shield layers 200. In Examples 1 to 4, the magnetic pole part 110A of the main magnetic pole layer 110 has a thickness of 300 nm.

Comparative Examples 5 to 7 are perpendicular magnetic recording heads without the pair of partial side shield layers 200, and correspond to the conventional perpendicular magnetic recording heads suppressing side fringes by only the bevel form of the magnetic pole part 110A of the main magnetic pole layer 110. Comparative Examples 5 to 7 differ from each other in terms of the thickness of the magnetic pole part 110A of the main magnetic pole layer 110, and are cases where the thickness of the magnetic pole part 110A of the main magnetic pole layer 110 is 300 nm, 250 nm, and 200 nm, respectively. Comparative Examples 5 to 7 have the same structure as that of the perpendicular magnetic recording head H1 in accordance with the first embodiment except for the pair of partial side shield layers 200 and the thickness of the magnetic pole part 110A. Comparative Example 5 has the same thickness of the magnetic pole part 110A as that of Examples 1 to 4, but differs therefrom in whether the pair of partial side shield layers 200 are provided or not.

Comparative Example 8 is a perpendicular magnetic recording head having a shield layer formed like a flat film surrounding the magnetic pole part 110A of the main magnetic pole layer 110 instead of the pair of partial side shield layers 200, and corresponds to the perpendicular magnetic recording heads of the above-mentioned Patent Documents 1 to 3. It has the same structure as that of the perpendicular magnetic recording head H1 in accordance with the first embodiment except for the shield layer. In Comparative Example 8, the shield layer is formed by NiFe, while the thickness of the magnetic pole part 110A of the main magnetic pole layer 110 is 300 nm as in Examples 1 to 4 and Comparative Example 5.

Figure 14:
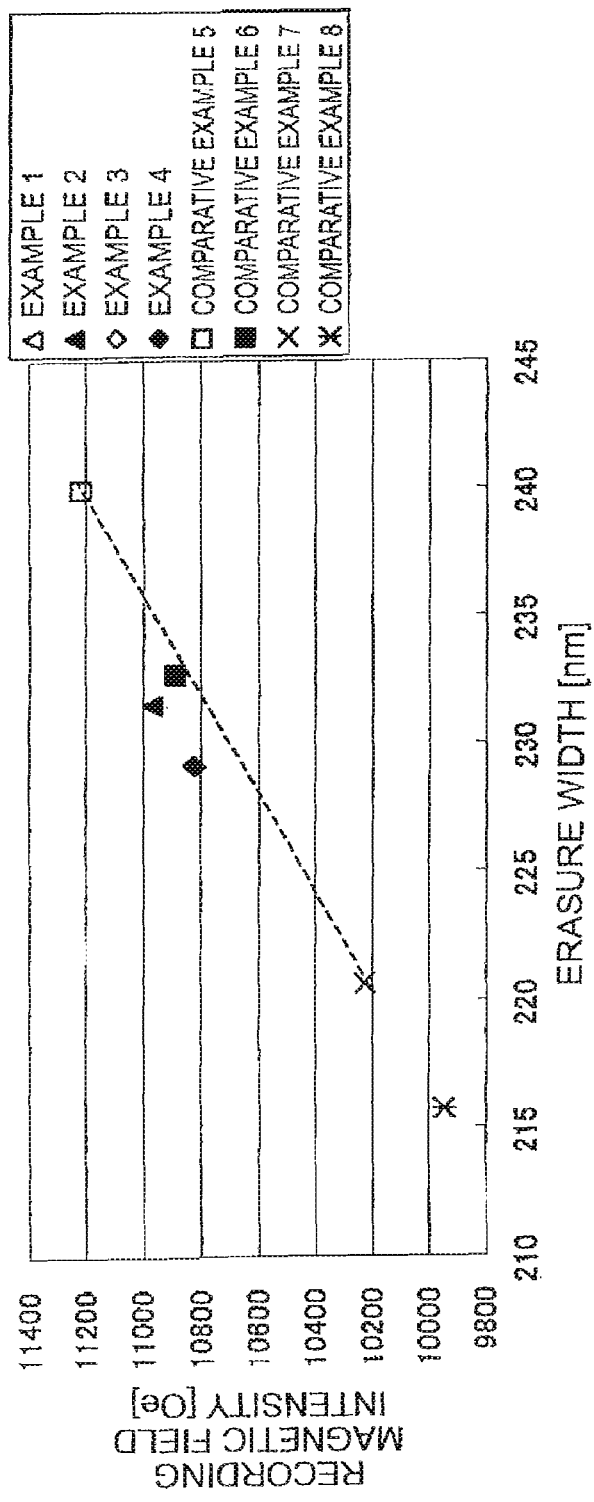
FIG. 14 is a graph showing results of situation indicating the relationship between the erasure width and recording magnetic field intensity at the time of skewing.

FIG. 14 is a graph showing results of simulations investigating the recording magnetic field intensity [Oe] and erasure width [nm] when driving the perpendicular magnetic recording heads of Examples 1 to 4 and Comparative Examples 5 to 8 at a skew angle of 14°. Here, the erasure width is a width magnetically acting on a recording medium in practice, and is the total of the recording track width Tw and side fringe width ΔS of the magnetic pole part 110A shown in FIGS. 6A and 6B. The recording magnetic field intensity is that at a medium recording layer corresponding to the trailing edge TE position of the magnetic pole part 110A of the main magnetic pole layer 110.

In FIG. 14, plotted results of Examples 1 and 2 overlap each other, while plotted results of Examples 3 and 4 overlap each other.

In the simulations of FIG. 14, the condition on the perpendicular magnetic recording head side is as follows:
    Recording track width Tw=125 nm
    Neck height Nh=100 nm
    Saturated magnetic flux density of the main magnetic pole layer=2.3 T
    Recording gap=50 nm
    Open angle of the $1^{st}$ flare part=40°
    Open angle of the $2^{nd}$ flare part=270°
    Bevel angle θ=9°
    Thickness of the auxiliary yoke layer=0.4 μm
    Saturated magnetic flux density of the auxiliary yoke layer=1.8 T The condition on the recording medium side is the same in all of Examples 1 to 4 and Comparative Examples 5 to 8.

As shown in FIG. 14, the plotted results of Examples 1 to 4 are shifted to the left from the line (illustrated by the broken line in FIG. 14) connecting the plotted results of Comparative Examples 5 to 7, which indicates that the erasure width becomes smaller than that in Comparative Examples 5 to 7, while the recording magnetic field intensity is not lowered extremely. Examples 1 to 4 clearly show that the pair of partial side shield layers suppress side fringing at the time of skewing, while keeping the recording magnetic field intensity.

In Comparative Examples 5 to 7, those in which the magnetic pole part 110A of the main magnetic pole layer 110 has a greater thickness tend to yield greater recording magnetic field intensity and recording magnetic field gradient. Comparative Example 7 in which the thickness of the magnetic pole part 110A is 200 nm yields a recording magnetic field intensity extremely smaller than that of Comparative Examples 5, 6 and thus may fail to perform a recording action with respect to a recording medium having a high coercivity, thereby being impractical. When the magnetic pole part 110A of the main magnetic pole layer 110 having a narrowed track is to be provided with a large bevel angle, the thickness of the magnetic pole part 110A cannot be maintained, whereby the recording magnetic field intensity becomes smaller as in Comparative Example 7.

In Comparative Example 8, the recording magnetic field intensity and recording magnetic field gradient are much smaller than those of Examples 1 to 4 and Comparative Examples 5 and 6, and thus are impractical. This seems to be because the shield layer formed like a flat film about the magnetic pole part 110A of the main magnetic pole layer 110 absorbs a large amount of magnetic fluxes directed from the magnetic pole part 110A to the recording medium. The total recording performance deteriorates when the recording magnetic field intensity and recording magnetic field gradient are small as such.

As mentioned above, the plotted results of Examples 1 and 3 overlap those of Examples 2 and 4, respectively, in FIG. 14. This indicates that the same effect can be obtained in both of the structure in which the pair of partial side shield layers 200 are provided such as to be magnetically separated from each other and the structure in which they are connected to the return yoke layer 150.

In this embodiment, as in the foregoing, a pair of partial side shield layers 200 are provided on both sides in the track width direction of the magnetic pole part 110A of the main magnetic pole layer 110 such as to be located more on the leading edge LE side. The pair of partial side shield layers 200 absorb side magnetic fluxes (leakage magnetic fields) spreading from both side faces 110A2 on the leading edge LE side of the magnetic pole part 110A and are not involved with the recording magnetic field Φ directed from the magnetic pole part 110A to the recording medium M. Therefore, while favorably keeping the recording magnetic field intensity, the side fringing at the time of skewing can be suppressed, so as to increase the recording magnetic field gradient. Hence, even when the bevel angle imparted to the magnetic pole part 110A of the main magnetic pole layer 110 is small, the side fringe suppressing effect similar to that in the case increasing the bevel angle of the magnetic pole part 110A can be obtained, which will be applicable to further narrower tracks in future. Since the bottom shield layer 300 is provided below the magnetic pole part 110A of the main magnetic pole layer 110 in this embodiment, the bottom shield layer 300 can absorb the leakage magnetic fluxes from the leading edge LE of the magnetic pole part 110A and can further suppress side fringing at the time of skewing.

What is claimed is:

1. A perpendicular magnetic recording head comprising a main magnetic pole layer and a return yoke layer, the main magnetic pole layer and return yoke layer being laminated with a predetermined distance therebetween on a surface opposing a recording medium and magnetically coupled to each other on a deeper side of the medium-opposing surface in a height direction, a magnetic pole part of the main magnetic pole layer exposed at the medium-opposing surface exhibiting a trapezoidal form narrower on a leading edge side than on a trailing edge side when seen from the medium-opposing surface;

wherein a pair of partial side shield layers made of a soft magnetic material are provided with each partial side shield layer on a respective side in a track width direction of the magnetic pole part of the main magnetic pole layer so as to be located more on the leading edge side of the magnetic pole part, and a bottom shield layer made of a soft magnetic material magnetically separated from the pair of partial side shield layers is provided below the leading edge of the magnetic pole part of the main magnetic pole layer.

2. A perpendicular magnetic recording head according to claim 1, wherein the pair of partial side shield layers are provided such that, at least on a side of an end face opposing the magnetic pole part of the main magnetic pole layer, a center line in a thickness direction of the partial side shield layers is positioned on the leading edge side of a center line in a thickness direction of the magnetic pole part.

3. A perpendicular magnetic recording head according to claim 1, wherein, in the pair of partial side shield layers, an end face opposing the magnetic pole part of the main magnetic pole layer forms a taper surface corresponding to the trapezoidal form of the magnetic pole part.

4. A perpendicular magnetic recording head according to claim 1, wherein, in the pair of partial side shield layers, an end face opposing the magnetic pole part of the main magnetic pole layer is positioned between a side face position in the track width direction on the trailing edge surface of the magnetic pole part and a side face position in the track width direction on the leading edge surface of the magnetic pole part.

* * * * *